United States Patent
Pflager et al.

(10) Patent No.: US 6,272,750 B1
(45) Date of Patent: *Aug. 14, 2001

(54) HYDROSTATIC PRE-LOAD PISTON

(75) Inventors: William W. Pflager, Waynesboro; Joel Metzler, Greencastle, both of PA (US)

(73) Assignee: Unova IP Corp., Woodland Hills, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/414,537

(22) Filed: Oct. 8, 1999

Related U.S. Application Data

(62) Division of application No. 09/026,560, filed on Feb. 20, 1998, now Pat. No. 6,033,116.

(51) Int. Cl.[7] .................................. B21D 53/10
(52) U.S. Cl. .................. 29/898.02; 29/898.07; 92/DIG. 2; 92/181 P
(58) Field of Search .................. 29/898, 898.07, 29/898.09, 898.1, 898.11, 898.03, 898.02, 898.12, 464, 465, 888.044; 384/8, 12, 13, 14, 15, 16; 91/487, 488; 92/181 R, DIG. 1, DIG. 2, 181 P, 148, 159

(56) References Cited

U.S. PATENT DOCUMENTS

| | | | |
|---|---|---|---|
| 3,619,013 | | 11/1971 | Jones .................................. 308/5 |
| 3,905,278 | * | 9/1975 | Ourdouillie ......................... 92/10 |
| 3,945,303 | * | 3/1976 | Steiger ................................ 92/58 |
| 3,994,367 | * | 11/1976 | Christ .................................. 184/5 |
| 4,000,559 | * | 1/1977 | Korrenn et al. .................... 308/35 |
| 4,007,522 | * | 2/1977 | Mold et al. ..................... 29/116 AD |
| 5,279,171 | | 1/1994 | Sola et al. .......................... 74/89 |
| 5,391,002 | * | 2/1995 | Eigenbrod ......................... 384/12 |
| 5,588,208 | * | 12/1996 | Sato et al. .................... 29/888.044 |
| 5,947,606 | * | 9/1999 | Wanger ............................ 384/100 |

* cited by examiner

*Primary Examiner*—S. Thomas Hughes
*Assistant Examiner*—Marc W Butler
(74) *Attorney, Agent, or Firm*—Hoffman, Wasson & Gitler

(57) ABSTRACT

A machine tool comprising a base, with a guide surface, a workpiece holder on the base, a movable tool carriage, and a motor for advancing the carriage along the guide surfaces toward the workpiece. Hydrostatic bearings are situated in the carriage for discharging fluid, such as oil, into the narrow gap defined between the carriage and the guide surface. A pre-load rail is secured to the movable carriage, and a plurality of pockets are defined in the pre-load rail. A hydrostatic pre-load piston, with an enlarged head and a depending base, is located in each pocket. A shallow depression is formed in the face of each piston, and an annular wall surrounds the depression, so that the piston restores itself to an equilibrium condition. The pre-load pistons are located in opposition to the hydrostatic bearings. An O-ring encircles the base of the piston, and allows floating, and tilting, movement of the piston within the pocket, while serving as a seal for the pocket. The individual pre-load pistons float and tilt to accommodate diverse localized distortions, anomalies, imperfections, and machining errors in the carriage and in the guide surface.

2 Claims, 6 Drawing Sheets

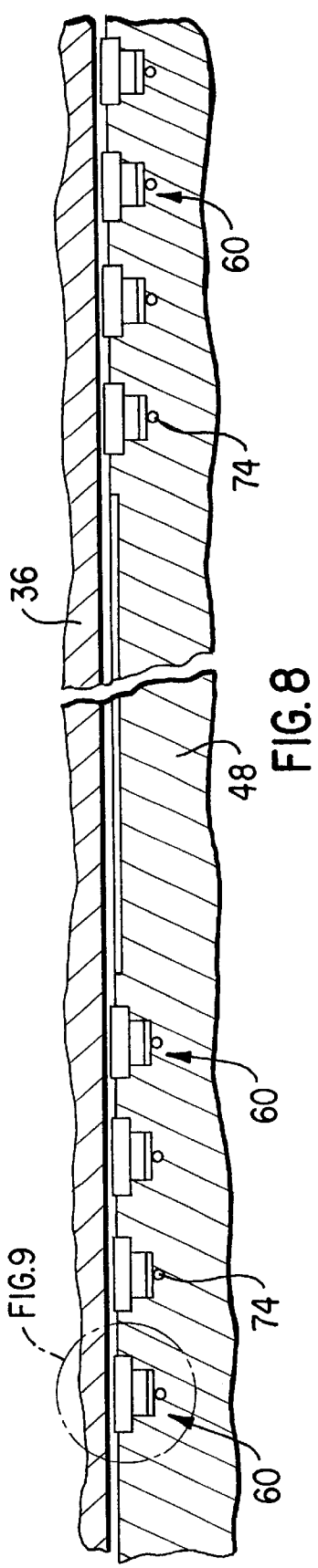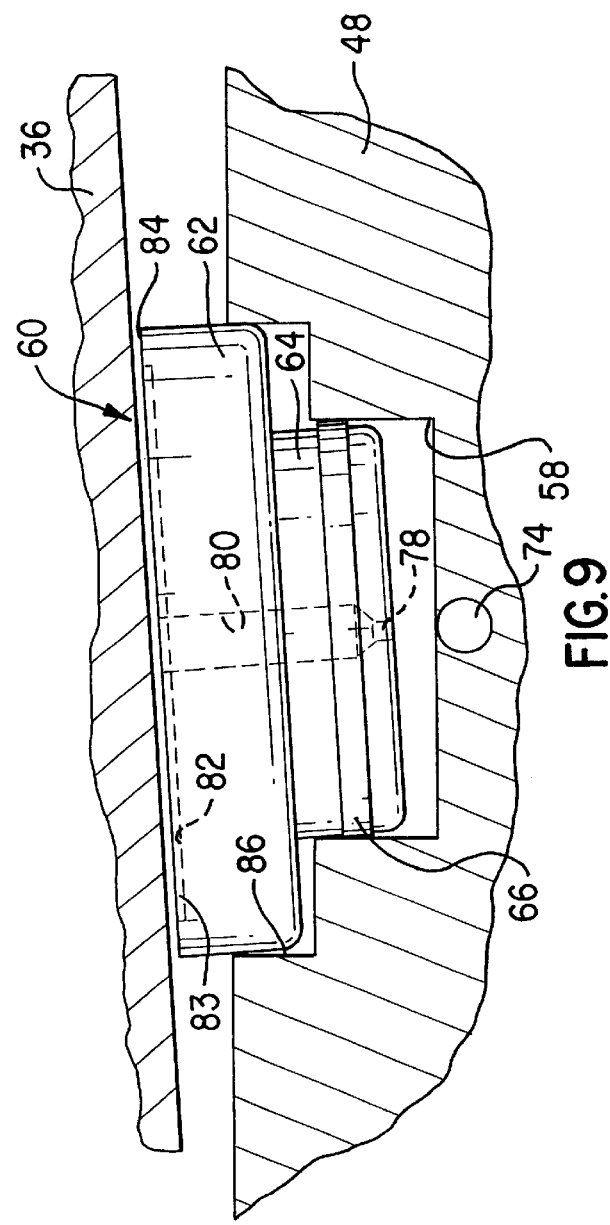

HYDROSTATIC PRE-LOAD PISTON

This application is a divisional of U.S. patent application Ser. No. 09/026,560, filed Feb. 20, 1998, now U.S. Pat. No. 6,033,116.

FIELD OF THE INVENTION

The instant invention relates to hydrostatic pre-load pistons that float, and tilt, within the movable carriage of a machine tool to accommodate thermal distortions, machining errors, and other imperfections, while tracking a guide surface. The pre-load pistons are located in opposition to conventional hydrostatic bearings, and are disposed in pockets in the pre-load rail.

BACKGROUND OF THE INVENTION

One or more fixed guide rails are usually situated at the upper end of the base of a machine tool, so that a movable carriage, which supports the machine tool, such as a grinding wheel or belt grinder, can be advanced, relative to the workpiece. A motor drives a lead screw assembly secured to the movable carriage so that the movable carriage is advanced relative to the workpiece. The workpiece is retained in fixed position between a head stock and a foot stock. The movable carriage, and the machine tool mounted thereon, are movable perpendicular to the centerline of the workpiece.

The movable carriage is usually a casting, and the base is a separate casting of considerably greater weight and size to provide stability for the machine tool. The guide rails are made of high-grade machine steel that has been manufactured, and finished, to exacting, extremely precise tolerances. Each guide rail includes two parallel surfaces, extending upwardly from the base. The underside of the movable carriage is configured to straddle the fixed guide rails.

Hydrostatic bearings are situated on opposite sides of the fixed guide rails to provide a thin film of fluid, such as oil, in the gap between the relatively movable parts, to allow the movable carriage to glide smoothly therealong. The film of fluid is introduced into the bearings, under pressure, from a remote source. Pressure is maintained in the bearings by the small gap between the adjacent surfaces. The gap may be in the order of a few thousandths of an inch.

The guide rails have been machined, in recent years, to ever tighter tolerances, as the demand for more accurately ground workpieces, and higher production rates, has increased significantly. The machining of both faces of the guide rail in a parallel, true fashion, has become an functional necessity; the machining operation is complicated by the length of the guide rail.

The underside of the movable carriage straddles each guide rail, and the facing surfaces of the movable carriage are designed to be spaced from the parallel, and true, faces of the guide rail. The bearings, usually located in the movable carriage, attempt to retain the movable carriage properly centered with respect to the guide rail, so that the machine tool can be advanced into working relationship with the workpiece, in an efficient, error-free manner. If the faces of the guide rail are not true and parallel, the movable carriage may shift a few thousandths of an inch closer to one facing surface, or the other, thereby reducing the accuracy of the machine tool. In extreme cases, if the faces are not parallel and true over their extended length, the gap may be diminished significantly, or even eliminated, so that the opposing metal surfaces of the movable carriage and the guide rail may come into contact. The movable carriage will then be seized, or "frozen", relative to the guide rail, with attendant scarring and structural damage to the contacting surfaces.

In order to maintain the movable carriage centered relative to the guide rail, fixed hydrostatic bearings were located in the underside of the movable carriage. The fixed hydrostatic bearings received a supply of pressurized fluid, through an aperture, or port, that discharged the fluid into the space or gap between the underside of the movable carriage and the opposing face of the guide rail.

Fixed hydrostatic bearings proved to be satisfactory when operating tolerance were fairly generous. However, as the operating tolerances were tightened in recent years, the fixed hydrostatic bearings have proven to be very difficult, and costly, to manufacture to the appropriate tolerances.

One proposed solution suggested the introduction of a pre-load mechanism into the movable carriage of the machine tool; such pre-load mechanism functioned in opposition to the conventional hydrostatic bearings. The pre-load mechanism introduced hydraulic fluid, such as pressurized oil, into the gap between the movable carriage and the guide rail. Hence, the pre-load mechanism tended to stiffen the sliding components of the machine tool and resist deflection.

To illustrate, U.S. Pat. No. 3,619,013, granted to Gordon H. Jones, discloses a hydrostatic way-bearing construction utilizing hydraulic pre-loading of opposed way bearing surfaces (18, 28; 19, 29) of the ways (15, 16) between relatively slideable machine tool members (table 11 slides on saddle 12). The construction comprises pre-load gibs (42; 54) having hydrostatic bearing surfaces (28, 29; 34). The pre-loading is accomplished by a plurality of longitudinally spaced hydraulic actuators (46 operatively associated with horizontal gib 42; 59 operatively associated with vertical gib 54). Some of the hydraulic actuators (46) are recessed within the holddown cleats (cleats or clamp plates 22, 24), while other actuators (59) are recessed within one of the vertically oriented pre-load gibs (such as gib 54, as shown in FIG. 5) of the Jones patent.

Preload gib (42) of U.S. Pat. No. 3,619,013 is formed as a flat bar extending substantially the length of the table (11), and is housed within a corresponding recess (44) in cleat plate (22), as noted in column 2, lines 53–44. A plurality of pre-load hydraulic actuators (46) are disposed along the bottom of recess (44), and pressurized oil or other hydraulic fluid is supplied to the hydraulic cylinders (48) for the actuators (46). The pre-load gib (42) thus provides a constant pre-load over the length of the table (11). The vertical pre-load gib (54) functions in a similar manner.

The "floating" gibs are movable toward, and away, from the guide rail on the saddle 12 in the Jones patent, to accommodate minor surface irregularities, or imperfections, within the face of the guide rail. Whereas the foregoing pre-loaded hydrostatic bearing system shown in U.S. Pat. No. 3,619,013, represented a marked improvement over fixed bearing systems, systems such as shown in Jones, require the manufacture and installation, of gibs, which are lengthy, rigid flat bars, that do not readily accommodate localized imperfections. Gibs (42) are restrained in movement longitudinally, within recess (44), by end retainer plates (45; see FIGS. 4 and 8), and are restrained laterally by the walls of the recess. Similar restraints are imposed upon the vertical gibs (54).

Despite advances in hydrostatic bearing systems, machine failures, wherein the movable carriage contacted or engaged, the guide rail, continued to occur. Such failures, whatever their cause, would have catastrophic consequences, for production lines would be shut-down for time consuming and costly repair, with attendant delays in production of product.

SUMMARY OF THE INVENTION

Applicant tested and analyzed several machine failures, and recognized that the temperature of the thin hydraulic film played a significant role in machine failures. More precisely, applicant determined that, if the temperature of the oil in the hydraulic bearing differed from the temperature of the movable carriage of the machine tool by a significant amount, the carriage will curl-up, or flex, in a fashion approximating a bimetallic member. The heated surface in contact with the thin film of oil expanded slightly, while the interior of the movable carriage remained at its usual temperature. The temperature differential thereby imparted a curl-up reaction, or bowing, to the movable carriage, and the curl-up reaction overcame or eliminated, the gap, or clearance, between the movable carriage and the fixed base of the machine tool. As a consequence, an area of contact was established that caused the machine to seize up (lock-up, or freeze), and caused attendant damage to the contacting surfaces.

The extensive testing of failed machines by applicant further revealed that the most common area of contact occurred at the end of the pre-load rail. As an interim solution, short pre-load rails were utilized in diverse machine tools, and the ends of the rails were relieved. Such solution, however, was not applicable to larger machine tools, with longer pre-load rails. Furthermore, in some instances, the condition was so severe that shortening pre-loads rails was inadequate.

Consequently, a more universal solution, that could be incorporated into the machine design process, regardless of machine size, was deemed necessary and desirable. Further experimentation and failure analysis was conducted that led to the instant hydrostatic pre-load piston system, relying upon a piston to float, and tilt, relative to the pre-load rail. The instant piston is simple in design, installation, and operation, accommodates the curl-up problem in the carriage, and is compatible with known hydrostatic bearings.

Thus, the instant floating, and tilting, and restrictor-less hydrostatic pre-load piston precludes machine failures whenever, and wherever, thermal deformation, or similar distortions, would otherwise negatively impact upon machine performance. The solution provided by the floating and tilting hydrostatic pre-load pistons has widespread potential application, for such solution responds well to localized distortions of all types, from curl-up, to machining errors, to imperfections in the faces of the guide surfaces, distortions attributable to machine loading, and the like, while maintaining the desirable stiffness characteristic associated with pre-load bearings.

The instant invention contemplates an adjustable hydrostatic pre-load piston floating within a pocket in a pre-load rail associated with the movable carriage of a machine tool. The "floating" piston, is also capable of a tilting, or rocking, movement within its pocket, without the loss of pressurized fluid in the pocket.

The hydrostatic pre-loading function attributable to the instant, tiltable, "floating" pre-load piston is related to the geometry of the step-compensated face of the piston, and is achieved without resorting to restrictors.

The floating and tilting action of the instant, unique hydrostatic pre-load piston accommodates the curl-up effect, as well as other distortions, and compensates for other flaws and/or imperfections in the guide surface, such as rails, on the base of the machine tool. The "floating" piston tracks, or follows, the adjacent face of the guide surface, and compensates for thermal distortion in the carriage, thereby preventing the movable carriage from seizing up, contacting, or otherwise marring the surface finish of the guide surface.

Furthermore, the tilting action of the instant pre-load piston addresses, and responds effectively to, the negative impact of the heated oil film, on the carriage. The tilting action of the instant floating pre-load piston renders same suitable for use with the guide surfaces, such as rails, ways, guides, slides, of diverse machines with movable carriages.

The oil film between the relatively moving surfaces is heated, under normal operating conditions, by shearing forces, frictional forces, etc. The heated oil, when reaching temperatures significantly greater than the adjacent surface of the movable carriage, e.g. 10° F., causes "curl-up" or bowing in the carriage. Such effect is most pronounced near the ends of the pre-load rail associated with the movable carriage, but the instant "floating" piston is capable of accommodating the curl-up effect, wherever encountered.

Thus, the instant invention responds to the problem of thermal deformation, or curl-up, which may occur, in the movable carriage, and is more pronounced near the ends thereof. Furthermore, the instant invention, while responding to thermal deformation, or curl-up, is equally proficient in responding to other imperfections or flaws in the guide surfaces.

In order to achieve optimum results, each "floating" and tiltable piston is retained in its own pocket in the pre-load rail of the movable carriage to apply a pre-loading force to the guide surfaces, on the base of the machine tool. Several floating pistons are located, at spaced intervals, along the length of the pre-load rail, and conventional, hydrostatic bearings, are located in opposition to the pre-load pistons. A key in each pocket on the pre-load rail fits into an aperture on the piston, to align the floating piston within its individual pocket.

Each floating and tilting piston in the pre-load rail has an O-ring secured about its base, to retain same in its individual pocket. The floating pistons are located in the pre-load rail to impart a force in opposition to the force of the conventional hydrostatic bearings, so that a minute gap can be maintained between the adjacent surfaces of the movable carriage of a machine tool and the guide surface.

Furthermore, each piston is capable of tracking the guide surface, such as a guide rail, at all times, despite any curl-up, or bowing, or distortions in the pre-load rail of the movable carriage. When one side of the piston moves too close to the guide rail, the pressure in the oil film trapped in such area increases and exerts a restoring force on the "floating" piston. The "floating" piston then resumes its equilibrium position, wherein the vertical axis of the piston is perpendicular to the guide surface, and tracks the guide surface while maintaining the desired gap between the piston and the guide surface. The ability of each piston to return to its equilibrium position is due to the stepped configuration of the face of the floating pre-load piston.

Other advantages realized by the instant "floating" and tilting hydrostatic pre-load piston will occur to the skilled artisan, when the appended drawings are construed in harmony with the ensuing description of the invention.

BRIEF DESCRIPTION OF THE DRAWINGS

FIG. 8 is a schematic representation of a plurality of pre-load pistons retained in the pre-load rail; and FIG. 9 is a view of one of the pre-load pistons of FIG. 8, such view being taken within the encircled area of FIG. 8 and on an enlarged scale.

DESCRIPTION OF THE INVENTION

Figure 1:
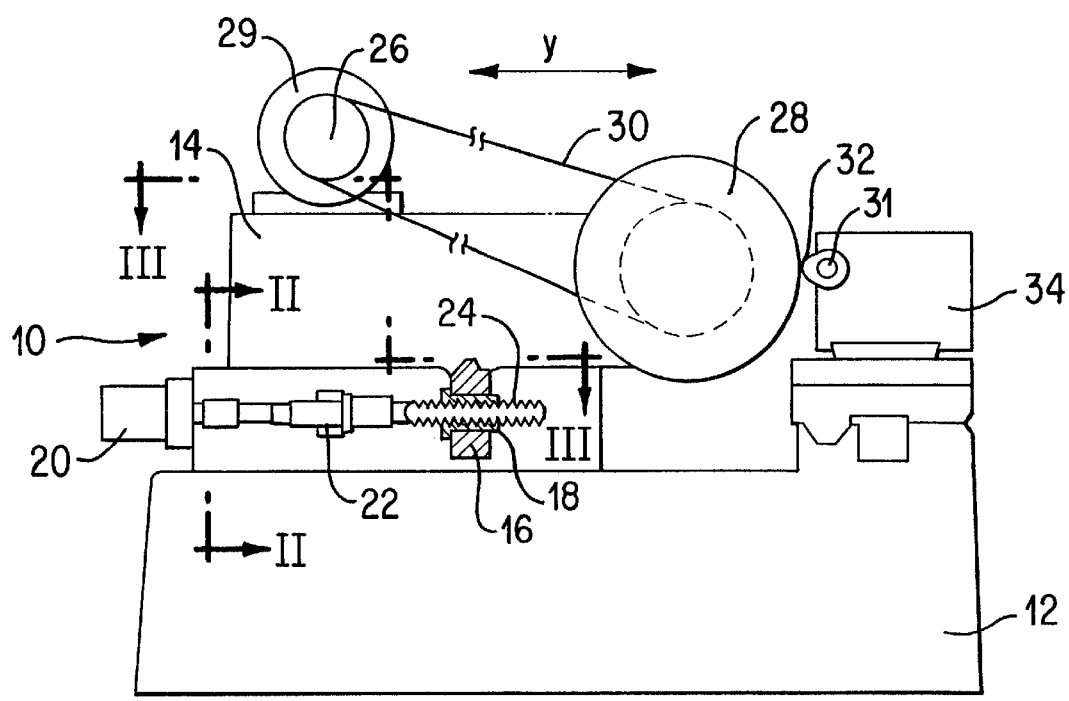
FIG. 1 is a schematic view of a known machine tool, such as a grinding machine, comprising a fixed base, a movable carriage, and a tool secured to the movable carriage.

Referring now to the drawings, FIG. 1 depicts, in a schematic manner, a machine tool 10, such as a grinding machine, of conventional design. Machine tool 10 comprises a fixed base 12, with a carriage 14 mounted atop the base. Flange 16 extends from carriage 14, and a follower 18 fits within an opening in the flange. Motor 20 rotates shaft 22, which is joined to lead screw 24. Lead screw 24 cooperates with follower 18 to advance, or retract, carriage 14 in the "y", or longitudinal, direction in FIG. 1.

A drive motor assembly 26 is located atop carriage 14, and a grinding wheel 28 is situated at the forward end of the carriage. An endless belt 30 transmits power from assembly 26 to grinding wheel 28 to rotate same at high rates of speed. Drive motor assembly 26 includes a large drive motor 29 to rotate grinding wheel 28.

A workpiece, such as a cam shaft 31 with eccentric surfaces, such as lobes 32, extends laterally across base 12 at the front of machine tool 10. One end of cam shaft 31 is retained in a chuck (not shown) in headstock 34, while the opposite end of cam shaft 31 is pressed into the chuck by a cooperating footstock (not shown), which is movable laterally toward the headstock. The longitudinal movement of carriage 14 toward cam shaft 31 is perpendicular to the center line of the workpiece, and the centers of rotation of the cam shaft 31 and grinding wheel 28 are parallel, for realization of the optimal grinding conditions necessary to meet the exacting tolerances for the workpiece dictated by current end-users of such products for high performance engines, and the like.

Figure 2:
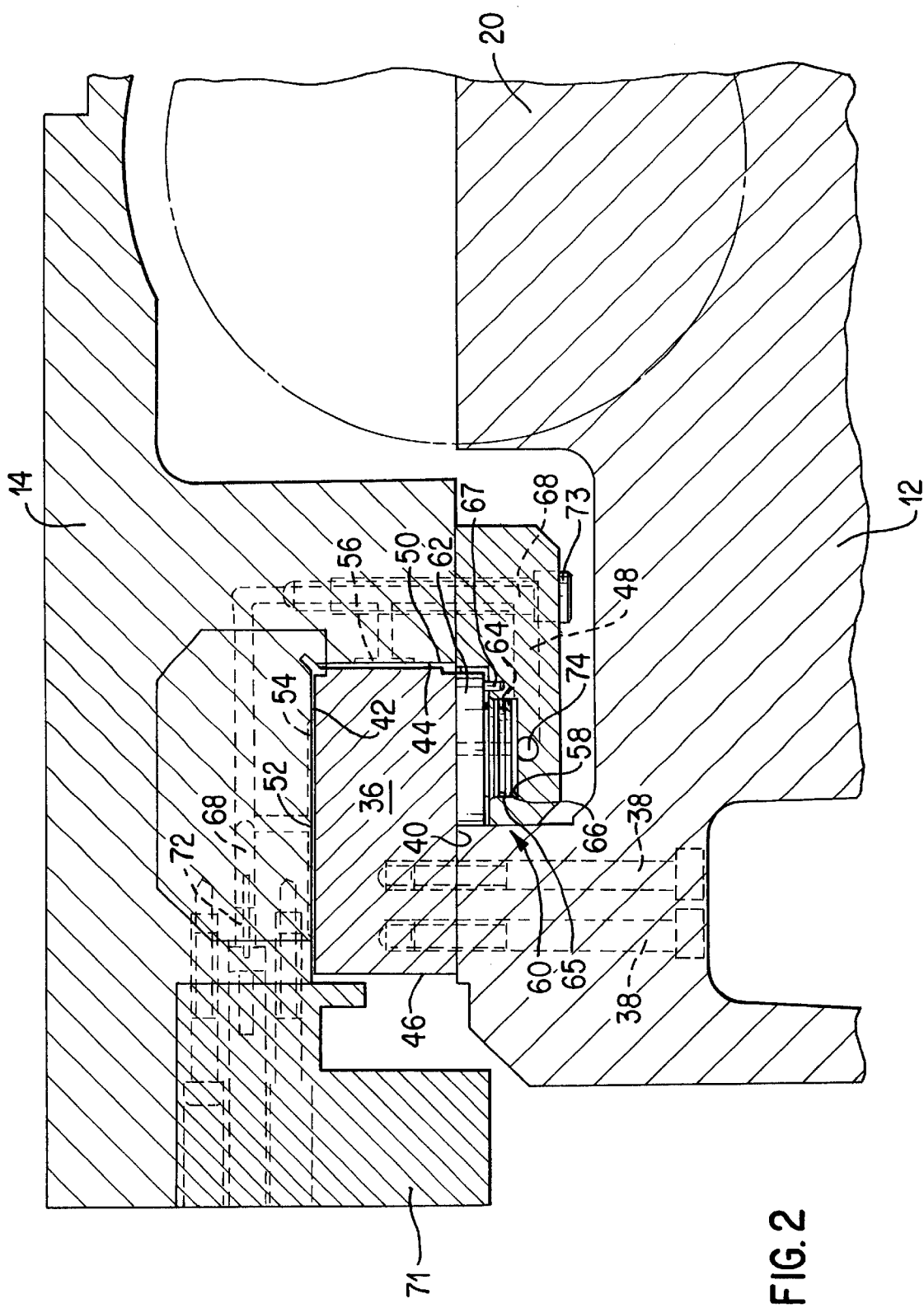
FIG. 2 is a fragmentary view, on an enlarged scale, of the movable carriage and fixed base of the machine tool, depicting hydrostatic pre-load pistons constructed in accordance with the principles of the instant invention; such view is taken along line II—II in FIG. 1, and in the direction indicated.

FIG. 2 indicates that at least one fixed guide surface, such as rail 36, is secured by bolts 38 to the upper end of base 12. Guide rail 36 is rectangular in cross-section, and bottom surface 40 and top surface 42 are completely flat and parallel to one another. Interior side wall 44 is parallel to exterior side wall 46, and perpendicular to bottom surface 40 and top surface 42 of guide rail 36.

A pre-load rail 48 is secured to the underside of carriage 14 in proximity to bottom surface 40 of fixed guide rail 36.

Vertical wall 50 in carriage 14 is located in proximity to interior side wall 44 of fixed guide rail 36, while horizontal wall 52 overlies upper surface 42 of fixed guide rail 36. Upper hydrostatic pads 54, shown in dotted outline, are defined in horizontal wall 52, and vertically oriented hydrostatic pads 56, of smaller dimensions, are defined in vertical wall 50 of carriage 14.

Several identical pockets 58 are formed at spaced intervals in pre-load rail 48. A pre-load piston 60 fits into each pocket. Each pre-load piston is T-shaped in vertical cross-section, and comprises an enlarged head 62 and a compact base 64. An O-ring 66 encircles base 64, and is seated in groove 65. A locator pin 67, located within pocket 58, extends upwardly from pre-load rail 48 to fit into aperture 76 in head 62 of piston 60. The pin and aperture align the piston in the pocket.

Passageways 68 are drilled, or otherwise formed, in carriage 14 to deliver pressurized fluid, such as oil, to the hydrostatic pads 54, 56. Other passageways 68 conduct the pressurized fluid through the carriage to the pre-load rail 48 and to the pockets 58 within the pre-load rail. A common source of pressurized fluid (not shown) delivers the fluid to the passageways via cap 71. Restrictor 72, such as a screw with a projecting needle or another mechanical control, may be used to adjust the pressure within passageways 68.

FIG. 2 shows that the hydrostatic pre-load piston 60 seated in pockets 58 in pre-load rail 48 are located in opposition to the hydrostatic bearings, or pads 54, disposed above the top surface 42 of guide rail 36.

The enlarged head 62 of piston 60 fits in the larger upper end of each pocket, while the smaller base 64 of the piston is received in the lower end of the pocket. Pre-load pistons 60 are located in opposition to upper hydrostatic pads 54, as previously noted, to increase the stiffness of the machine tool.

Figure 3:
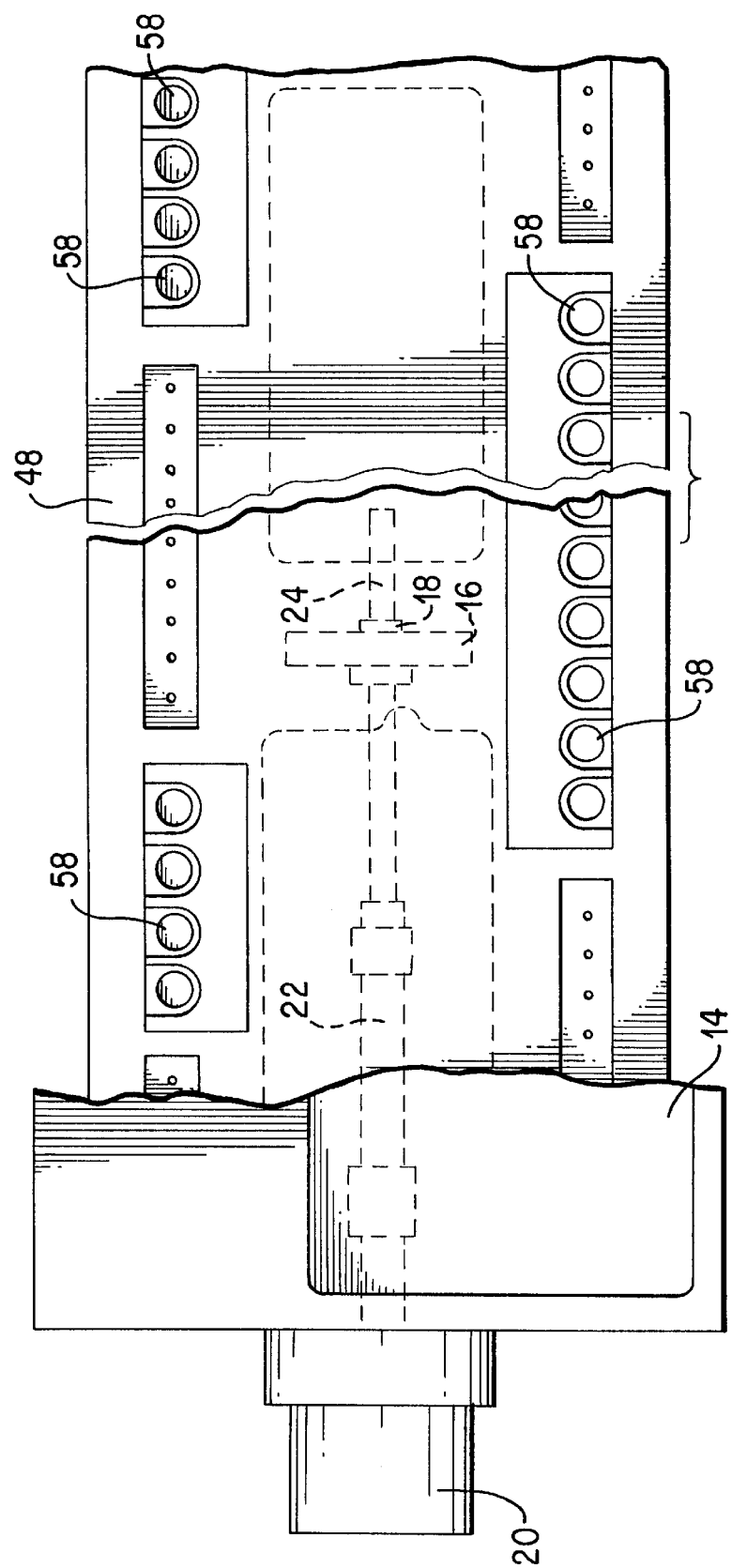
FIG. 3 is a top plan view of the pre-load rail that receives the pre-load pistons, such view being taken along line III—III in FIG. 1, in the direction indicated and on an enlarged scale.

FIG. 3 suggests that pockets 58 are situated along pre-load rail 48. The pre-load pistons 60 are absent from pockets 58 so that the relative dimensions, and shape, of each pocket, are visible. The pockets, and operatively associated pistons, are located to effectively oppose the hydrostatic bearings, or pads 54, situated on the opposite side of guide rail 36.

Figure 4:
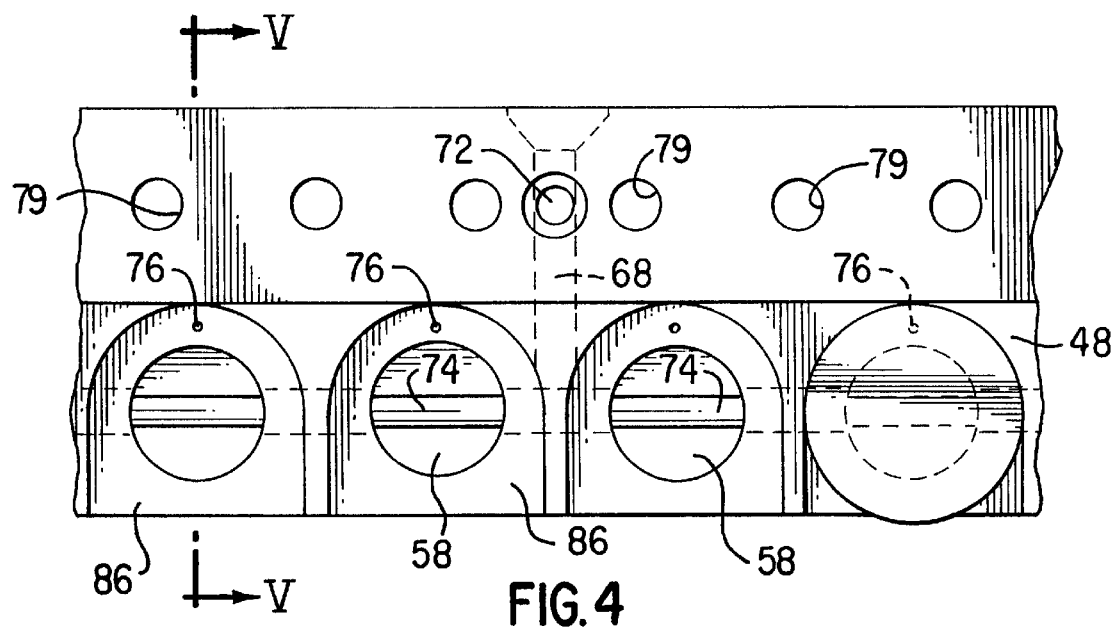
FIG. 4 is a top plan view, on a further enlarged scale, of a fragment of the pre-load rail of FIG. 3.
Figure 5:
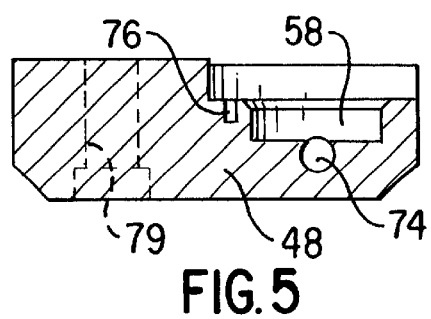
FIG. 5 is a vertical cross-sectional view of the pre-load rail, such view being taken along line V—V in FIG. 4 and in the direction indicated.

FIGS. 4 and 5 show additional details of pre-load rail 48. A passageway 68 communicates with the pre-load rail to receive the pressurized fluid, such as oil, introduced into the machine tool from a remote source, or reservoir. Passageway 68 communicates with conduit 74, which delivers the pressurized fluid to each pocket 58 in the pre-load rail. Conduit 74 communicates with the lower end of pocket 58, which receives the base 64 of piston 60.

An aperture 76 is formed in each piston 60. The aperture is sized to accept locator pin 67 in each pocket. When locator pin 67 is inserted into aperture 76, piston 60 is properly seated within its individual pocket 58. Bolt holes 79 receive fasteners 73 that enable the pre-load rail 48 to be secured to the underside of carriage 14 and straddle, at least partially, fixed guide rail 36.

Figure 6:
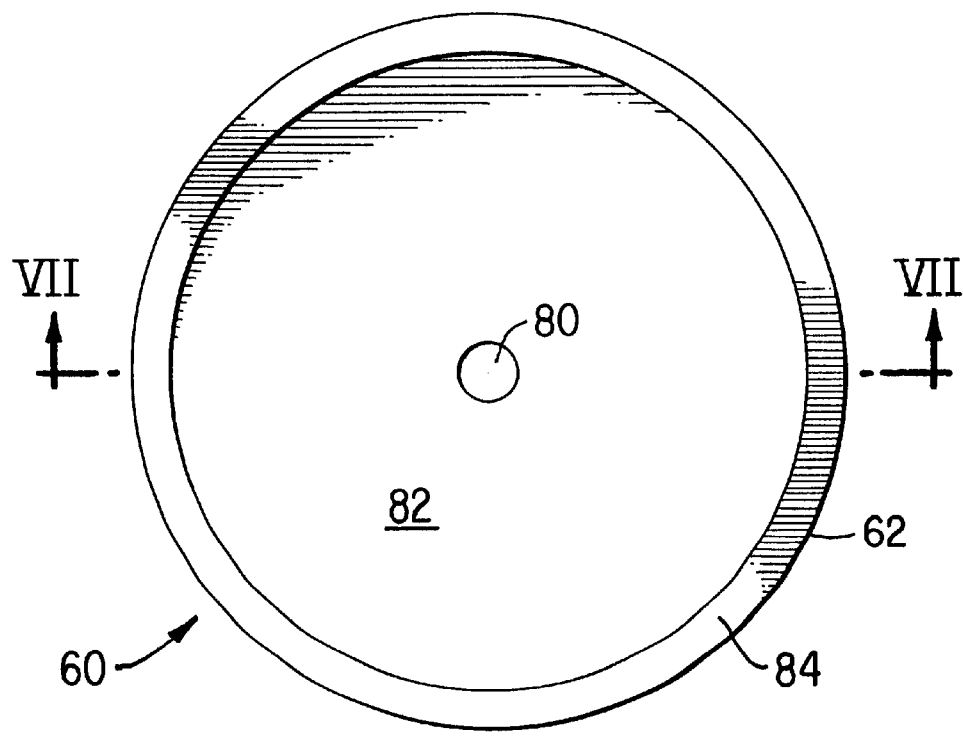
FIG. 6 is a top plan view of a hydrostatic pre-load piston employed within the pre-load rail.
Figure 7:
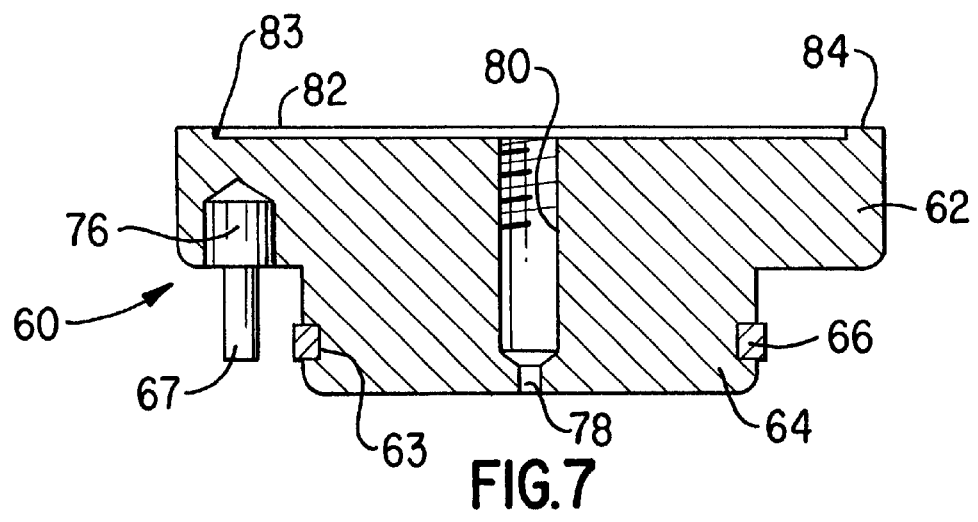
FIG. 7 is a vertical cross-sectional view of the hydrostatic pre-load piston, such view being taken along line VII—VII in FIG. 6 and in the direction indicated.

FIGS. 6 and 7 show piston 60, on an enlarged scale. An axial passage 78 communicates with conduit 74, and allows pressurized fluid to enter and pass upwardly through central bore 80. A shallow circular depression 82 is defined in the face of piston 60, and an annular wall 84 extends circumferentially about depression 82. A small, annular step 83 is defined between depression 82 and the top of annular wall 84.

Pocket 58 is sized and configured to allow piston 60 to move relative thereto. The O-ring 66 prevents fluid from escaping from the pocket. The flexibility of O-ring 66 allows the piston to float and to tilt, in all directions.

Consequently, when pressurized fluid is introduced from a remote source into passageways 68, fluid flows into conduit 74 in pre-load rail 48. The fluid flows into axial passage 78, through central axial bore 80, and fills depression 82. O-ring 66 maintains fluid within the pocket. When piston 60 floats and tilts within its pocket 58 relative to pre-load rail 48, the movement of the piston accommodates localized flaws attributable to diverse causes, including curl-up, and allows the movable carriage to glide on a thin film of fluid relative to the fixed guide rail 36 on base 12.

FIG. 8 shows, in diagrammatic fashion, the manner in which a series of pistons 60, retained in a plurality of individual pockets 58 in pre-load rail 48, float and/or tilt. The tilting action of each piston accommodates distortions in the guide surface, such as rail 36, and in movable carriage 14, while maintaining a thin film hydrostatic fluid between the surfaces on the carriage moving relative to the fixed guide surface.

FIG. 9 depicts the tilting action of piston 60, relative to pocket 58, on a greatly enlarged scale. O-ring 66 retains the base 64 of piston 60 in pocket 58, while allowing floating and tilting actions. Fluid, under pressure, flows through conduit 74, into passage 78, central bore 80, and thence into shallow depression 82. O-ring 66 maintains fluid under pressure within pocket 58. Annular wall 84 retains the hydrostatic fluid within depression 82, despite the tilting action. The tilting action of each piston 60, relative to pre-load rail 48, enables the pistons to move perpendicular to, and track, the guide surface 36 with great accuracy and precision, despite thermal distortions and/or other flaws. Even though pre-load rail 48 may no longer be in parallel alignment with guide rail 36, the pistons within the hydrostatic bearings function as if such relationship were, in fact, maintained with complete accuracy and integrity.

Furthermore, due to its stepped geometry, piston 60 exhibits a self-restoring property, that allows it to establish an equilibrium position relative to the surface of guide rail 36. Consequently, if piston 60 pivots counterclockwise (in FIG. 9) toward guide rail 36, the downward force of the base squeezes the oil trapped in the small gap between annular wall 84 and guide rail 36. At the opposite side of the piston, the gap is increased in size and pressure drops. The pressure differential imparts a clockwise force to the piston, which tilts back to an equilibrium position, with its vertical axis perpendicular to the guide surface. Thus, the pre-load piston exhibits an inherent, self-restoring property, that enhances its operational characteristics while obviating the need for mechanical restrictors.

CYCLE OF OPERATION

Pre-load pistons 60 in pre-load rail 48, are pressurized by hydrostatic fluid passing through passageway 68, conduit 74, passage 78, and bore 80 to contact the underside of the guide surface, such as rail 36. Flexible, resilient O-rings 66 act as seals to maintain pressure within the pocket. Also, the O-rings act as pivots for the floating and tilting motion of pistons 60. The fluid flows through the pistons 60 into the gap that separates the movable carriage and the guide rail.

Pressurized fluid is delivered via passageways 68 to the hydrostatic pads 54 formed in the surface of the movable carriage facing the upper side of fixed guide rail 36. Pads 54 attempt to maintain a uniform gap between the movable carriage and the fixed guide rail 36. Pre-load pistons 60 function in opposition to the hydrostatic bearings, or pads 54, and impart stiffness to the machine tool.

Any imperfections in pre-load rail 48 and/or in carriage 14 and/or in guide rail 36 will be accommodated by the floating and tilting action of the individual pistons 60. The axial bore and stepped upper surface of piston 60 deliver a thin film of oil into the gap between the movable carriage 14 and guide rail 36. The pistons are able to float and tilt relative to pre-load rail 48 and maintain their orientation perpendicular to guide rail 36, even if pre-load rail 48 "curls up", or bows, and/or is forced, into the gap between the pre-load rail and the guide rail. Such deformation may be caused by thermal gradients in the movable carriage attributable to the heating of the oil in the hydrostatic bearings. The floating and tilting action of each piston also accommodates anomalies in the guide rail, due to the capability of the piston to accommodate, locally, flaws and imperfections of different types.

Hydrostatic pads 56 are also pressurized to maintain the clearance between the movable carriage, and fixed guide rail 36, in the horizontal direction. The vertical, and horizontal, restraints imposed by the hydrostatic bearings, and the pre-load pistons, insure smooth, unimpeded, movement between the movable carriage and the guide surface(s) of the machine tool employing same.

Whereas the preferred embodiment of the invention has been described with reference to a machine tool, the instant hydrostatic pre-load piston, with its ability to float and tilt, will be equally applicable to ways, guides, slides, journals, of more general purpose; the term "guide surface" is used to identify such component in a generalized manner. The hydrostatic pre-load pistons may be incorporated into new machines as original equipment, or may be retrofitted onto existing machines for enhanced operation. The hydrostatic pre-load pistons are located in opposition to conventional hydrostatic bearings, such as pads, to increase the stiffness of the machine tool and to resist deflection under heavy loads. The pre-load pistons are easy to install, operate, and maintain, over the life of the machine tool, and do not require mechanical restrictors.

Other modifications or revisions in the configuration of the pre-load piston may occur to the skilled artisan. For example, the head of the piston need not be greatly enlarged relative to the base, and the geometry of the face of the piston may be varied, without reducing its effectiveness. Consequently, the appended claims should be construed in a liberal manner consistent with the significant advances in the useful arts and sciences, realized by the invention, and should not be limited to the exact terminology adopted in the claims of record.

We claim:

1. A method of compensating for flaws in a guide surface and carriage of a machine, said machine comprising a base, at least one guide surface projecting from said base, a movable carriage mounted upon said guide surface, hydrostatic bearings located between said movable carriage and said base for facilitating movement therebetween, motor means for advancing said carriage along said guide surface, a pre-load rail fastened to said movable carriage, and conduit means defined in said movable carriage and said pre-load rail to establish communication therebetween, the method comprising the steps of:

a) forming a plurality of separate, distinct upwardly opening pockets in said pre-load rail,
   b) forming a plurality of pistons, each piston comprising a head and a depending base,
   c) forming an axial bore extending through each piston to communicate with a shallow depression formed in the head of said piston, d) forming an annular wall that is stepped upwardly above said depression in each piston for receiving fluid therein to produce a restoring force to compensate for flaws in the guided surface and the movable carriage of said machine, e) inserting a piston into each pocket, f) securing a flexible member about said base of each piston to retain said piston within its pocket in said pre-load rail, g) introducing hydrostatic fluid, under pressure, into said conduit means so that hydrostatic fluid flows into each pocket and thence through said axial bore in said piston and into said shallow depression to create a thin film between said pre-load rail and said guide surface, h) said flexible member also sealing said pocket so that said hydrostatic fluid exerts an upwardly directed force upon said piston, i) said pistons functioning as pre-load bearings disposed in opposition to said hydrostatic bearings located between said carriage and said base, j) each piston floating, and tilting, about its flexible member relative to said pre-load rail to thereby follow said guide surface.

2. The method of compensating for flaws in the guide surface and the movable carriage, as recited in claim 1, further including the steps of:

k) forming a notch around said base of each said piston, and l) inserting said flexible member, which assumes the form of an O-ring, into said notch to seal said pocket.

* * * * *